(12) United States Patent
Lin et al.

(10) Patent No.: US 8,226,286 B2
(45) Date of Patent: Jul. 24, 2012

(54) EDGE-LIT BACKLIGHT MODULE

(75) Inventors: Wen-yu Lin, Taipei (TW); Taso-yuan Fu, Luzhu Township (TW); Hao-ping Cheng, Bade (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 230 days.

(21) Appl. No.: 12/842,972

(22) Filed: Jul. 23, 2010

(65) Prior Publication Data
US 2011/0273905 A1 Nov. 10, 2011

(30) Foreign Application Priority Data
May 4, 2010 (TW) .............................. 99208250 U

(51) Int. Cl.
*F21V 7/04* (2006.01)

(52) U.S. Cl. ...................................... 362/613; 362/612

(58) Field of Classification Search .................. 362/612, 362/613, 606
See application file for complete search history.

(56) References Cited

U.S. PATENT DOCUMENTS
7,934,863 B2* 5/2011 Mori et al. .................... 362/612
2010/0188599 A1* 7/2010 Arihara ........................... 349/60
2010/0315834 A1* 12/2010 Seo ............................... 362/612

* cited by examiner

*Primary Examiner* — Evan Dzierzynski
(74) *Attorney, Agent, or Firm* — Cheng-Ju Chiang

(57) ABSTRACT

An edge-lit backlight module includes a back plate, a light bar, and a light guide plate. The back plate has a bottom plate and four lateral sides. Each of the lateral sides is perpendicular to the bottom plate and connected to a peripheral edge of the bottom plate. The light bar is disposed on a side of an internal face of one of the lateral sides to leave at least one accommodation space on the lateral side. The light guide plate has at least one extension portion corresponding to the accommodation space. The light guide plate is disposed on the bottom plate, and each extension portion of the light guide plate engages with the corresponding accommodation space for fixing the light guide plate onto the back plate.

10 Claims, 5 Drawing Sheets

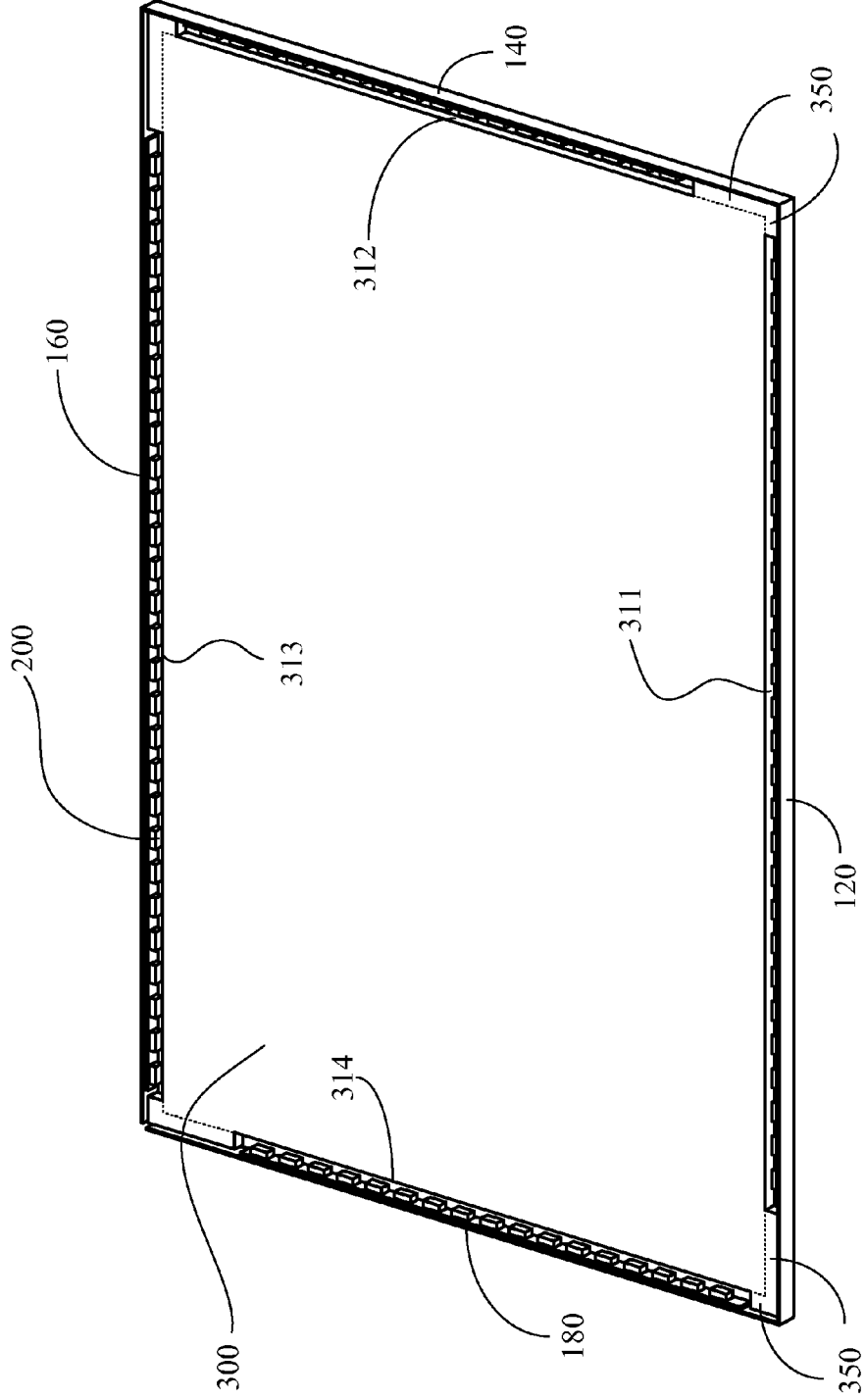

EDGE-LIT BACKLIGHT MODULE

TECHNICAL FIELD OF THE INVENTION

The present invention relates to a backlight module, and especially to an edge-lit backlight module.

BACKGROUND OF THE INVENTION

A conventional liquid crystal display (LCD) includes an LCD panel and a backlight module. Because the LCD panel cannot actively emit light, the backlight module is required to be as a light source. The backlight module includes a backlight source, a back cover, a light guide plate (LGP), a reflector, a diffuser, a brightness enhancement film (BEF), and other optical films. A cold cathode fluorescent lamp (CCFL) and a light emitting diode (LED) are commonly used as light sources for the backlight module. Since the LED has more advantages such as low power consumption, long lifespan, no mercury additives and other advantages, the LED is gradually replacing CCFL to be a mainstream backlight source.

According to the placement location of the backlight source, the backlight modules can be generally categorized into the following types: a direct type backlight module and an edge-lit backlight module. The direct type backlight module has the light sources disposed on the back of the backlight module. The edge-lit backlight module has the light sources disposed on the sides of the light guide plate, and the light guide plate guides the light to pass through the light guide plate to the back of the LCD panel. Similarly, the backlight modules that utilize the LEDs as light sources can be categorized into these types: a direct type LED backlight module and an edge-lit LED backlight module. There are two advantages of the edge-lit LED backlight module: the first advantage is the edge-lit LED backlight module uses fewer LED dice than the direct type LED backlight module so as to save costs. The second advantage is that a lighter weight LCD can be manufactured by utilizing the edge-lit LED backlight module. The edge-lit LED backlight module does not require an LED module and the cooling components to be disposed at the rear of the LCD panel, instead, they are disposed on the sides of the LCD panel. Such structure can reduce the overall thickness of the LCD, so that an LCD TV with a lighter weight can be produced in comparison to the LCD TV using the direct type LED backlight modules.

At present, due to the increasing size of a bigger screen TV, more light sources are required to provide light to the display panel. Therefore, a general four-sided edge-lit LED backlight module utilizes four LED light bars to be placed on the four edges of the screen to provide light. FIG. 1 is a perspective view of a prior art back plate having an edge-lit LED backlight module with LEDs on 4 edges. Please refer to FIG. 1, a back plate 100 includes a bottom plate 110, four lateral sides 120, 140, 160 and 180. In addition, four L-type baffles 111, 112, 113 and 114, being designed to be disposed at four corners of the bottom plate 110, are deformed from the stamping parts of the back plate 100. The four L-type baffles 111, 112, 113 and 114 are utilized to fix a light guide plate 300 onto the back plate, and the four L-type baffles are to restrict the movement of the light guide plate in order to avoid damaging the LED dice on the LED light bars (not shown) when impacting the light guide plate.

However, the conventional L-type baffles cannot ensure that the light guide plate is tightly disposed on the back plate, and this may result in loosening the light guide plate. In addition, when a shock test is proceeded on the backlight module, the LED light bars may be impacted by the loosened light guide plate. Consequently, the LED dice may be broken, hence causing the reliability of the backlight module to be reduced. Moreover, the conventional method of fixing the light guide plate is to fix with the protrusions or baffles which are produced by stamping the sheet metal of the back plate or by other material processing. However, the aforesaid material processing can also increase the production costs.

Therefore, there is an urgent need to provide a novel edge-lit backlight module to overcome the above-mentioned drawbacks.

SUMMARY OF THE INVENTION

To overcome the above-mentioned drawbacks, one object of the present invention is to provide an edge-lit backlight module having a more stable fixing method to fix a light guide plate onto a back plate.

Another object of the present invention is to provide an edge-lit backlight module to reduce the production costs of a back plate.

To achieve the above-mentioned objects, a preferred embodiment of the present invention provides an edge-lit backlight module including a back plate, a light bar and a light guide plate. The back plate has a bottom plate and four lateral sides being perpendicular to the bottom plate and connected to the peripheral edges of the bottom plate. More specifically, the bottom plate has a surface, and the lateral sides are connected to the peripheral edges of the bottom plate and substantially perpendicular to the surface. The light bar is disposed on the side of an internal face of one of the lateral sides to expose at least one accommodation space on one of the lateral sides. The light guide plate has at least one extension portion corresponding to the accommodation spaces, wherein the light guide plate is disposed on the bottom plate, and the extension portions of the light guide plate are embedded into the accommodation spaces for fixing the light guide plate onto the back plate.

In one aspect of the present invention, the edge-lit backlight module further includes three light bars which are disposed on the sides of the internal faces of the remaining three lateral sides. The accommodation spaces include a plurality of first accommodation spaces and a plurality of second accommodation spaces which are left at both ends of the internal faces of the four lateral sides. For each lateral side, the lengths of the first accommodation space and the second accommodation space are not the same. In addition, the lengths of any two adjacent accommodation spaces of the adjacent lateral sides are not the same, so that the light emitted by the LED light bars is evenly distributed in the light guide plate for reducing the occurrences of dark corners. Furthermore, the formation of the two adjacent extension portions corresponding to any two adjacent accommodation spaces is an L-shape.

In another aspect of the present invention, the extension portions of the light guide plate engage with the accommodation spaces to fix the light guide plate onto the back plate. In addition, the light bar has a plurality of light-emitting diodes, and one side of the light guide plate and the corresponding light bar are at a distance between 0.3 mm-0.7 mm. In addition, the edge-lit backlight module further includes a plurality of optical films disposed on the light guide plate.

As mentioned, the light guide plate is directly attached to the back plate with the accommodation spaces, which are defined by the light bars fixed on the four lateral sides. Thus, the drawback in prior art where the light guide plate cannot be rigidly fixed onto the back plate is solved. Moreover, there is no requirement to additionally produce protrusions or baffles onto the back plate to fix the light guide plate, thereby reducing production costs.

BRIEF DESCRIPTION OF THE DRAWINGS

The present invention will now be described in detail with reference to a preferred embodiment thereof as illustrated in the accompanying drawings in which:

FIG. 5 is a perspective view of the edge-lit backlight module of the present invention.

DETAILED DESCRIPTION OF THE INVENTION

Figure 1:
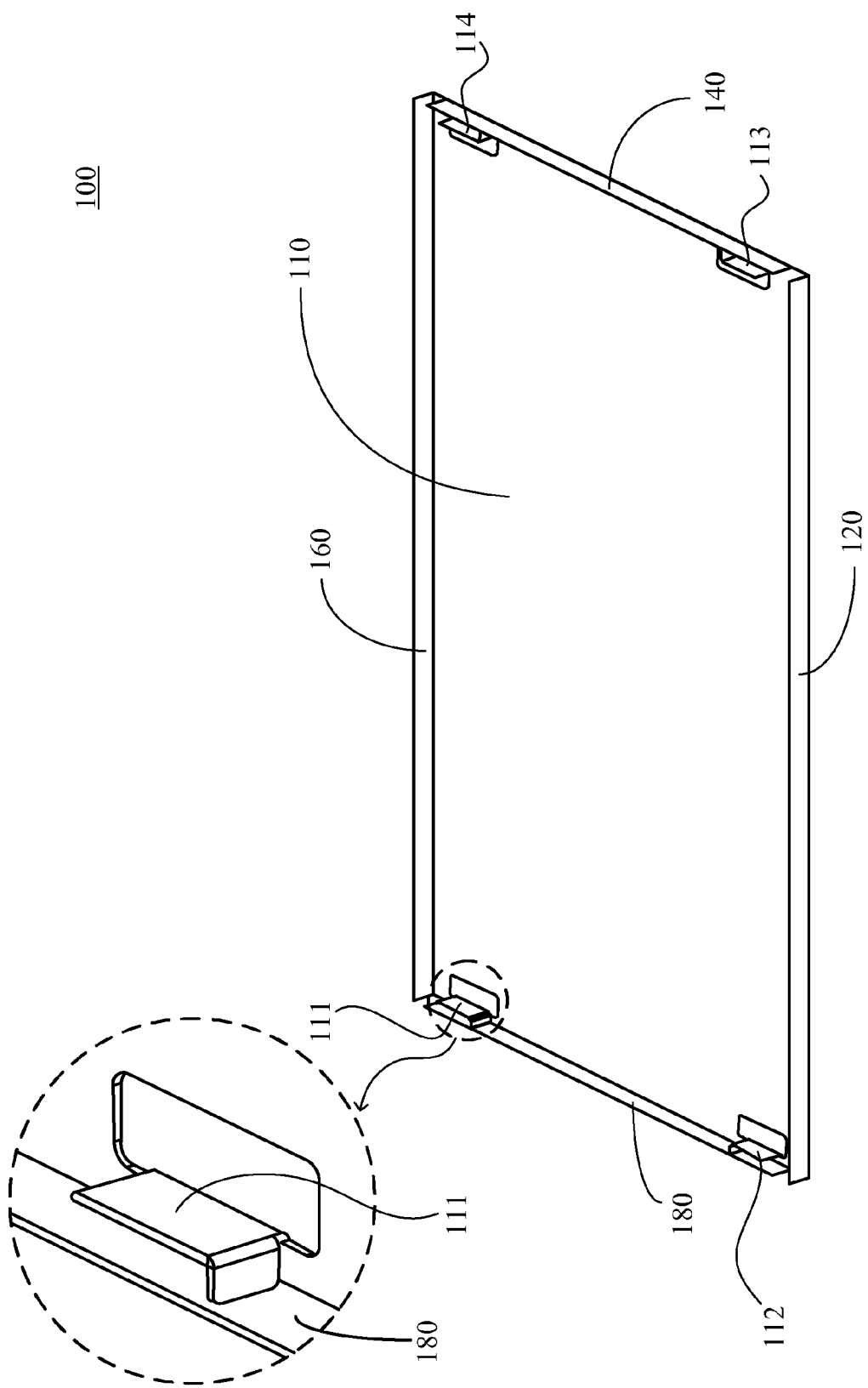
FIG. 1 is a perspective view of a prior art back plate having an edge-lit LED backlight module with LEDs on 4 edges.
Figure 2:
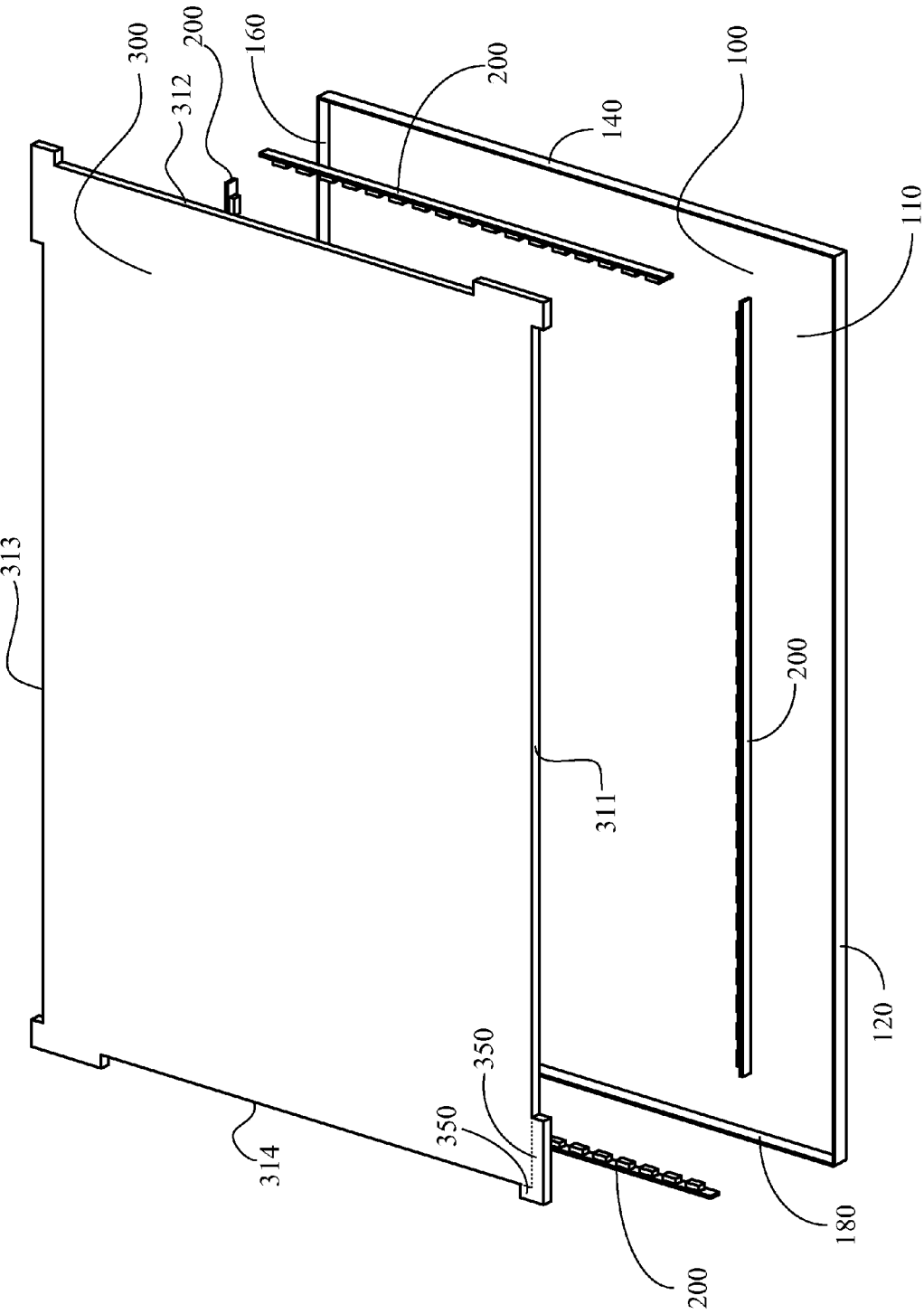
FIG. 2 is an exploded perspective view illustrating an edge-lit backlight module of the present invention.

Referring to FIG. 2, FIG. 2 is an exploded perspective view illustrating an edge-lit backlight module according to one preferred embodiment of the present invention. The edge-lit backlight module includes a back plate 100, a light bar 200 and a light guide plate 300. Please note that the preferred embodiment is illustrated by a four-sided edge-lit backlight module according to the present invention. This means that the edge-lit backlight module further includes three light bars 200. However, the present invention is not limited to implement a four-sided edge-lit backlight module. For example, a two-sided edge-lit backlight module, i.e. light being emitted only from the top side and the bottom side or only from the left side and the right side, can also be implemented.

The back plate 100 has a bottom plate 110 and four lateral sides 120, 140, 160 and 180, being perpendicularly disposed at the four sides of the bottom plate 110. More specifically, the bottom plate 110 is with a surface where the lateral sides 120, 140, 160, 180, are connected to peripheral edges of the bottom plate 110 and are perpendicular to the surface. The four lateral sides 120, 140, 160, 180, and the bottom plate 110 are made of metal, and the four sides can be formed with the bottom plate 110 as a one-piece formation by a stamping process. However, the present invention does not limit the four lateral sides 120, 140, 160 and 180 to be implemented as a one-piece formation with the bottom plate 110, i.e. the lateral sides can be formed as individual components and also can be implemented as such.

Figure 3:
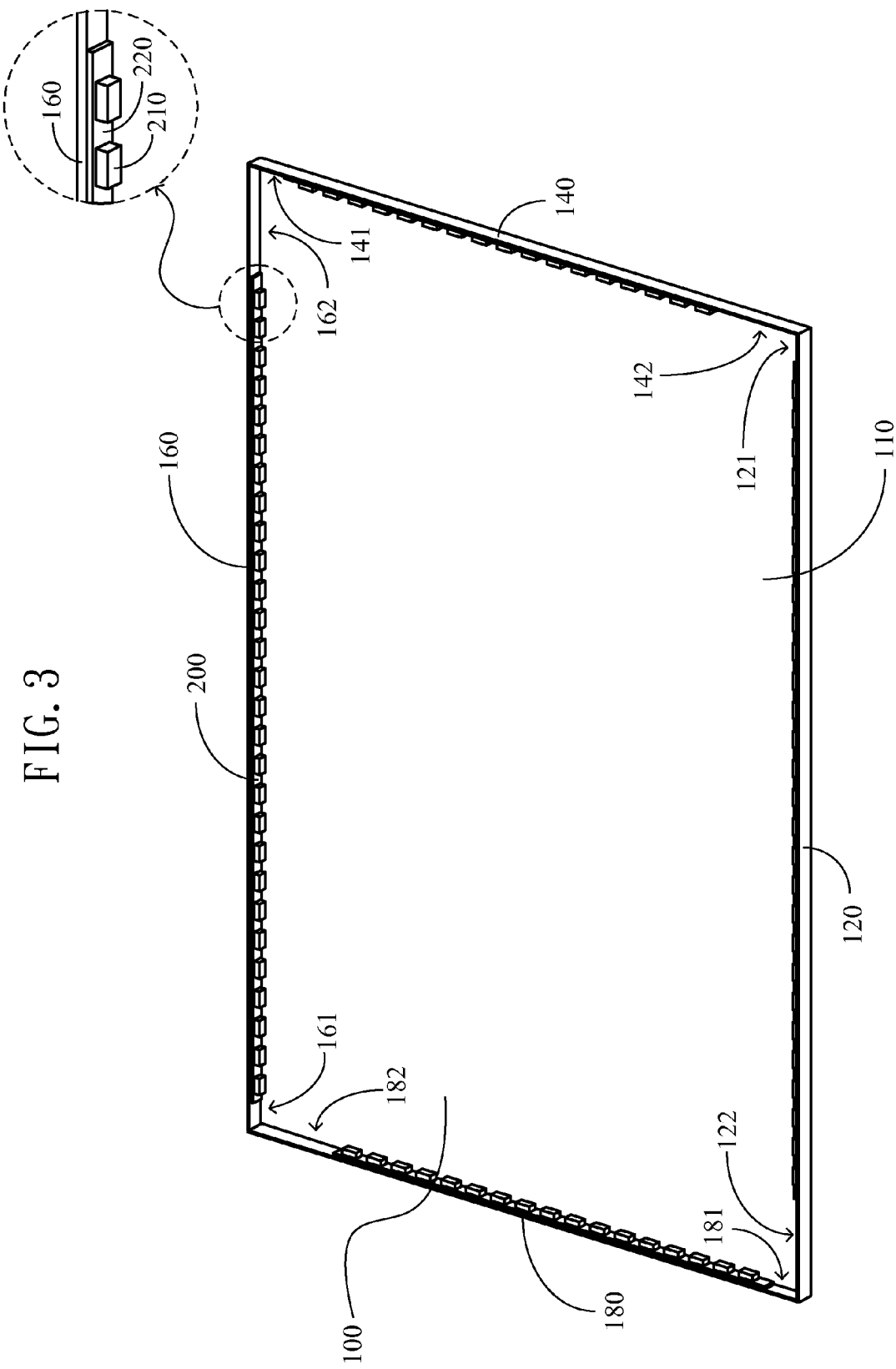
FIG. 3 is a perspective view of the formation of the light bar and the back plate in accordance with the present invention.

FIG. 3 is a perspective view of the formation of the light bars 200 and the back plate 100 of the present invention. Referring to FIG. 3, one of the light bars 200 is disposed on a side of an internal face of the lateral side 160. In addition, the other three LED light bars 200 are disposed on sides of the internal faces of the lateral sides 120, 140 and 180. The internal faces of the lateral side 120 and lateral side 160 are opposite to and face each other. Moreover, the internal faces of the lateral side 140 and lateral side 180 are opposite to and face each other. The light bars 200 are utilized to provide light to the edge-lit backlight module. For example, the light bar 200 has a plurality of LEDs, that is, a plurality of LED dice 210 being coupled to a circuit board 220, and the LED light bar 200 is attached to the internal face of the lateral side 160 by using heat plastic (not shown) as demonstrated by the partial enlargement diagram shown.

The light bars 200 are disposed on the internal faces of the lateral sides 120, 140, 160 and 180, so that at least one accommodation space is left at the lateral sides 120, 140, 160 and 180. In another aspect of the present invention, the internal faces of the lateral sides 120, 140, 160 and 180 expose at least one accommodation space of either first accommodation spaces 121, 141, 161, 181, or second accommodation spaces 122, 142, 162, 182. Using the lateral side 160 for example, the areas on the internal face of the lateral side 160 where the LED light bar 200 is not disposed will expose the first accommodation space 161 and the second accommodation space 162.

Dark corners occur as a result of inadequate light coverage at the four corners of the LCD panel. Therefore, in order to uniformly distribute the light emitted from the light bar 200 to cover all of the light guide plate for reducing the dark corners, the lengths of the first accommodation space 161 and the second accommodation space 162 are designed to be different lengths. Specifically, the design of the lengths can be computed via optical simulation software by calculating the dot-pattern of the light guide plate to obtain the suitable lengths. However, the present invention does not restrict the lengths of the first accommodation space 161 and the second accommodation space 162 to necessarily be of different lengths, an equal length of such can also be implemented.

Figure 4:
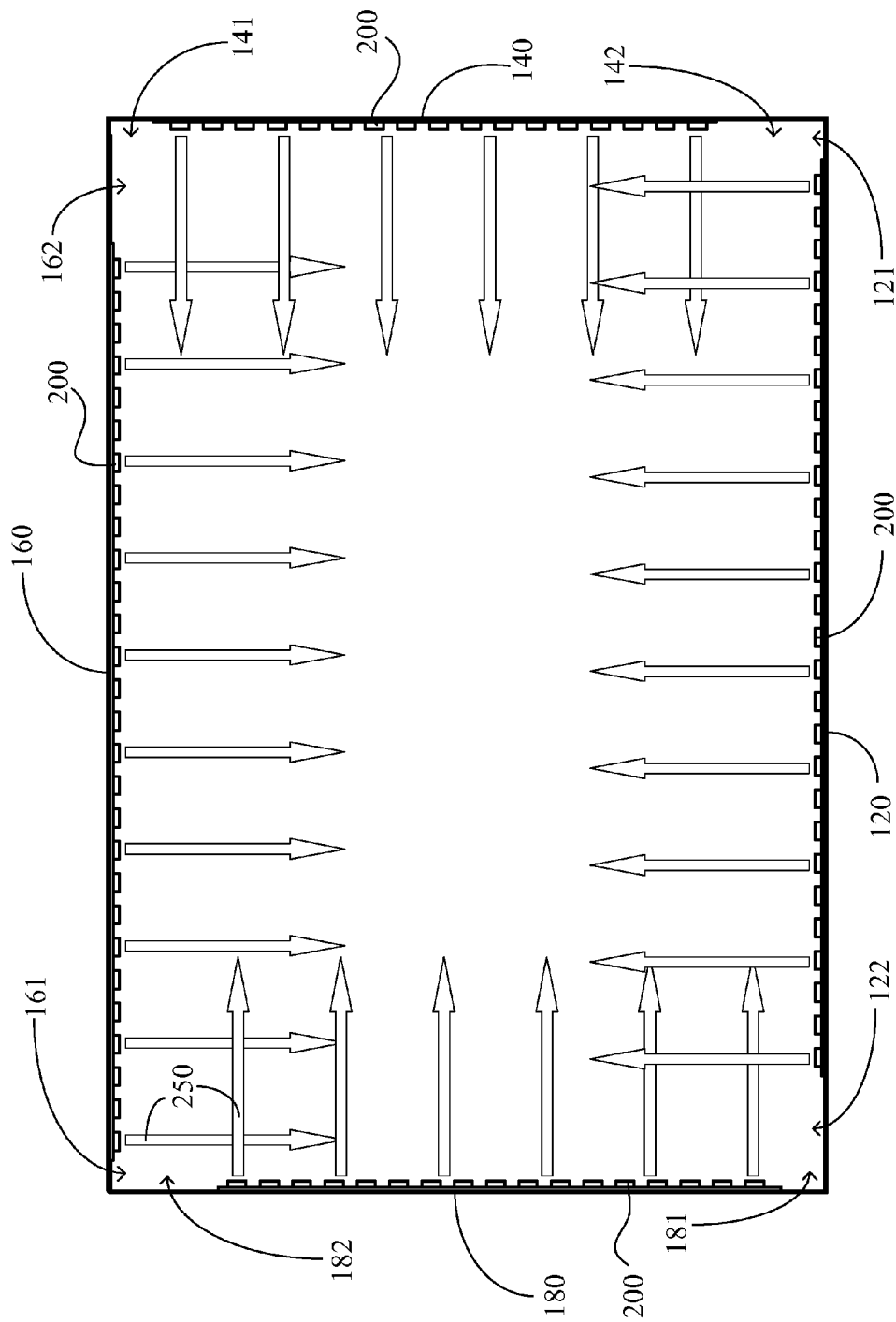
FIG. 4 is a top view of the emission diagram of the formation of the back plate and the light bar in accordance with the present invention.

FIG. 4 is a top view of the emission diagram of the formation of the back plate 100 and the light bars 200 of the present invention. Referring to FIG. 4, the lengths of any two adjacent accommodation spaces (e.g. 121 and 142, 141 and 162, 161 and 182, 181 and 122) of the adjacent lateral sides are not the same. Using as an example, the two adjacent accommodation spaces 161 and 182 of the lateral sides 160 and 180, the first accommodation space 161 is a shorter accommodation space of lateral side 160; the second accommodation space 182 is a longer accommodation space of the lateral side 180. The lights 250 (shown as arrows) that are emitted from the light bars 200 of this structure cover the entire region of the bottom plate 110 so as to eliminate the dark corners as described above.

FIG. 5 is a perspective view of the edge-lit backlight module of the present invention. Referring to FIG. 5 in conjunction with FIG. 2, the light guide plate 300 has at least one extension portion 350 corresponding to the accommodation spaces. The extension portions 350 are the protrusions extending from the sides of the light guide plate 300, and the extension portions 350 are formed as a one-piece formation with the light guide plate 300, as shown by dotted lines in FIG. 2 and FIG. 5. The light guide plate 300 is disposed on the bottom plate 110, and the extension portions 350 of the light guide plate 300 are engaged with the accommodation spaces for fixing the light guide plate 300 onto the back plate 100. Using the lateral side 120 for example, the two extension portions 350 of the first accommodation space 121 and the second accommodation space 122 at both ends of the lateral side 120 (as shown in FIG. 4) engage with the first accommodation space 121 and the second accommodation space 122 to fix the light guide plate 300 on the back plate 100. It should be noted that the formation of the two adjacent extension portions 350 of any two adjacent accommodation spaces (such as 121 and 142, 141 and 162, 161 and 182, 181 and 122) is an L-shape protrusion formed at four corners of the light guide plate 300. The extension portions 350 of the light guide plate 300 engage with the lateral sides 120, 140, 160 and 180 to firmly fix the light guide plate 300 onto the back plate 100.

According to the present invention, the spaces formed between the extension portions 350 of the light guide plate 300 and the four lateral sides 120, 140, 160 and 180, are utilized to accommodate the light bars 200. While the light guide plate 300 are embedded and fixed onto the back plate 100, the light guide plate 300 receives the light emitted from the light bars 200 to pass through to the bottom of the display panel. The light guide plate 300 are with four incident planes 311, 312, 313 and 314, and the incident planes are at distances between 0.3 mm-0.7 mm apart with the corresponding light bars.

In addition, the edge-lit backlight module in accordance with the present invention also includes a diffuser and a brightness enhancement film (BEF) and other optical films disposed on the light guide plate, with which a person skilled in the art is familiar. Moreover, a front bezel element is included; however, no details are provided herewithin.

In summary, the accommodation spaces formed by the four lateral sides combining with the light bars in the edge-lit backlight module according to the present invention, the light guide plate is directly embedded onto the back plate, where the light guide plate is rigidly fixed with the accommodation spaces located at the four corners of the back plate. Thus, the prior art drawback that the light guide plate cannot be rigidly fixed on the back plate is solved. Moreover, there is no requirement to additionally produce protrusions or baffles on the back plate in order to fix the light guide plate, and it can be implemented in simple four lateral sides combining the bottom plate, and reducing production costs.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. An edge-lit backlight module, comprising:
   a back plate having a bottom plate and four lateral sides perpendicular to the bottom plate and connected to the peripheral edges of the bottom plate;
   a light bar, disposed on a side of an internal face of one of the lateral sides to leave at least one accommodation space on the lateral side; and
   a light guide plate having at least one extension portion corresponding to the at least one accommodation space;
   wherein each extension portion of the light guide plate engages with the corresponding accommodation space for fixing the light guide plate onto the back plate when the light guide plate is disposed on the bottom plate.

2. The edge-lit backlight module of claim 1, further comprising three light bars disposed on the other sides of the internal faces of the remaining three lateral sides.

3. The edge-lit backlight module of claim 2, wherein the accommodation spaces comprise a plurality of first accommodation spaces and a plurality of second accommodation spaces which are left at both ends of the internal faces of the four lateral sides.

4. The edge-lit backlight module of claim 3, wherein the lengths of the first and the second accommodation spaces are not the same.

5. The edge-lit backlight module of claim 4, wherein the lengths of any two adjacent accommodation spaces of the adjacent lateral sides are not the same.

6. The edge-lit backlight module of claim 5, wherein the formation of the two adjacent extension portions corresponding to any two adjacent accommodation spaces is an L-shape.

7. The edge-lit backlight module of claim 1, wherein the extension portions of the light guide plate engage with the lateral sides to fix the light guide plate onto the back plate.

8. The edge-lit backlight module of claim 1, wherein the light bar has a plurality of light-emitting diodes.

9. The edge-lit backlight module of claim 1, wherein each side of the light guide plate has an incident plane which is at a distance between 0.3 mm-0.7 mm with the corresponding light bar.

10. The edge-lit backlight module of claim 1, further comprising a plurality of optical films disposed on the light guide plate.

* * * * *